US012450467B2

United States Patent
Chhabria et al.

(10) Patent No.: US 12,450,467 B2
(45) Date of Patent: Oct. 21, 2025

(54) DETERMINING IR DROP

(71) Applicant: NVIDIA Corporation, Santa Clara, CA (US)

(72) Inventors: Vidya Chhabria, Minneapolis, MN (US); Yanqing Zhang, San Jose, CA (US); Haoxing Ren, Austin, TX (US); Brucek Kurdo Khailany, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 1094 days.

(21) Appl. No.: 17/211,695

(22) Filed: Mar. 24, 2021

(65) Prior Publication Data

US 2022/0067481 A1 Mar. 3, 2022

Related U.S. Application Data

(60) Provisional application No. 63/071,220, filed on Aug. 27, 2020.

(51) Int. Cl.
| | |
|---|---|
| G06N 3/04 | (2023.01) |
| G06F 30/00 | (2020.01) |
| G06F 30/27 | (2020.01) |
| G06F 30/36 | (2020.01) |
| G06F 30/373 | (2020.01) |
| G06N 3/045 | (2023.01) |
| G06N 3/08 | (2023.01) |
| G06N 3/084 | (2023.01) |
| G06F 119/06 | (2020.01) |

(52) U.S. Cl.
CPC ............... *G06N 3/04* (2013.01); *G06F 30/27* (2020.01); *G06F 30/36* (2020.01); *G06F 30/373* (2020.01); *G06N 3/045* (2023.01); *G06N 3/08* (2013.01); *G06N 3/084* (2013.01); *G06F 30/00* (2020.01); *G06F 2119/06* (2020.01)

(58) Field of Classification Search
CPC ............ G06N 3/04; G06N 3/045; G06N 3/08; G06N 3/084; G06F 30/27; G06F 30/36; G06F 30/373; G06F 30/00; G06F 2119/06
USPC ......................................................... 703/14
See application file for complete search history.

(56) References Cited

U.S. PATENT DOCUMENTS

| | | | |
|---|---|---|---|
| 6,397,375 B1 | 5/2002 | Block et al. | |
| 6,522,186 B2 | 2/2003 | O'Mahony et al. | |

(Continued)

OTHER PUBLICATIONS

Tian, Teng, et al. "Exploration of memory access optimization for FPGA-based 3D CNN accelerator." 2020 Design, Automation & Test in Europe Conference & Exhibition (DATE). IEEE, 2020. (Year: 2020).*

(Continued)

*Primary Examiner* — John E Johansen
(74) *Attorney, Agent, or Firm* — Zilka-Kotab, P.C.

(57) ABSTRACT

The IR drop for a portion of a circuit may include a voltage drop across resistance, and may include a product of current I passing through resistance with a resistance value R. In order to determine IR drop for a circuit in a more accurate and efficient manner, a neural network produces coefficient maps (that each indicate a time-varying distribution of power within an associated portion of the circuit), and these coefficient maps are then used by the neural network to determine an IR drop for each of a plurality of portions of the circuit.

26 Claims, 13 Drawing Sheets

(56) References Cited

U.S. PATENT DOCUMENTS

| | | | |
|---|---|---|---|
| 7,006,962 | B1 | 2/2006 | Goyal et al. |
| 7,693,660 | B2 | 4/2010 | van Diggelen et al. |
| 7,797,664 | B2 | 9/2010 | Matsumoto et al. |
| 8,032,301 | B2 | 10/2011 | van Diggelen et al. |
| 8,825,464 | B2 | 9/2014 | Srinivasan |
| 9,739,888 | B2 | 8/2017 | Cheng et al. |
| 11,403,444 | B1 | 8/2022 | Seluga |
| 2010/0218019 | A1 | 8/2010 | Eckhard |
| 2011/0213508 | A1 | 9/2011 | Mandagere et al. |
| 2017/0310967 | A1 | 10/2017 | Banerjee et al. |
| 2018/0181864 | A1* | 6/2018 | Mathew ............. G06N 3/084 |
| 2020/0327417 | A1 | 10/2020 | Xie et al. |

OTHER PUBLICATIONS

Xie, Zhiyao, et al. "PowerNet: Transferable dynamic IR drop estimation via maximum convolutional neural network." 2020 25th Asia and South Pacific Design Automation Conference (ASP-DAC). IEEE, 2020. (Year: 2020).*

Yamato, Yuta, et al. "A fast and accurate per-cell dynamic IR-drop estimation method for at-speed scan test pattern validation." 2012 IEEE International Test Conference. IEEE, 2012. (Year: 2012).*

Fang, Yen-Chun, et al. "Machine-learning-based dynamic IR drop prediction for ECO." 2018 IEEE/ACM International Conference on Computer-Aided Design (ICCAD). IEEE, 2018. (Year: 2018).*

Restriction Requirement from U.S. Appl. No. 15/929,242, dated Sep. 13, 2020.

Non-Final Office Action from U.S. Appl. No. 15/929,242, dated Nov. 29, 2022.

Ahmed et al., "Transition Delay Fault Test Pattern Generation Considering Supply Voltage Noise in a SOC Design," Design Automation Conference, 2007, 7 pages.

Chhabria et al., "Template-based PDN Synthesis in Floorplan and Placement Using Classifier and CNN Techniques," 25th Asia and South Pacific Design Automation Conference (ASP-DAC), 2020, 6 pages, retrieved from https://www.semanticscholar.org/paper/Template-based-PDN-Synthesis-in-Floorplan-and-Using-Chhabria-Kahng/9a4580b36608c856f61b7c752400c495f86a3f3e.

Xie et al., "PowerNet: Transferable Dynamic IR Drop Estimation via Maximum Convolutional Neural Network," IEEE, 2020, 6 pages, retrieved from https://42papers.com/p/powernet-transferable-dynamic-ir-drop-estimation-via-maximum-convolutional-neural-network.

Fang et al., "Machine-learning-based Dynamic IR Drop Prediction for ECO," ICCAD '18, Nov. 2018, 7 pages.

Yamato et al., "A Fast and Accurate Per-Cell Dynamic IR-drop Estimation Method for At-Speed Scan Test Pattern Validation," IEEE International Test Conference (ITC), 2012, pp. 1-8.

Deshpande et al., "Vector Profiling Based on Advanced Power Analytics," powerpoint, published as a poster at the DAC2020, 8 pages.

Chhabria et al. "Thermal and IR Drop Analysis Using Convolutional Encoder-Decoder Networks," arXiv, 2020, 6 pages, retrieved from https://arxiv.org/abs/2009.09009.

Ronneberger et al., "U-Net: Convolutional Networks for Biomedical Image Segmentation," Medical Image Computing and Computer-Assisted Intervention (MICCAI), vol. 9351, 2015, 8 pages, retrieved from https://lmb.informatik.uni-freiburg.de/people/ronneber/u-net/.

Covington et al., "Deep Neural Networks for YouTube Recommendations," Proceedings of the ACM Recommender Systems Conference, 2016, 8 pages.

Paszke et al., "PyTorch: An Imperative Style, High-Performance Deep Learning Library," 33rd Conference on Neural Information Processing Systems (NeurIPS), 2019, 12 pages.

Kingma et al., "ADAM: A Method for Stochastic Optimization," ICLR, 2015, 15 pages.

Xie et al., U.S. Appl. No. 15/929,242, filed Mar. 17, 2020.

Ho et al., "IncPIRD: Fast Learning-Based Prediction of Incremental IR Drop," IEEE/ACM International Conference on Computer-Aided Design (ICCAD), 2019, 8 pages, retrieved from https://www.semanticscholar.org/paper/IncPIRD%3A-Fast-Learning-Based-Prediction-of-IR-Drop-Ho-Kahng/12d93ddfbe569246b29ae58ddae9b8f619fcda25.

* cited by examiner

DETERMINING IR DROP

FIELD OF THE INVENTION

The present disclosure relates to performing circuit design analysis.

BACKGROUND

During the design of a circuit, IR drop within the circuit is commonly measured, as it is a design factor within the circuit that affects the timing and functionality of the circuit. However, current solutions for measuring IR drop for a circuit are slow to implement and may miss cases of significant IR drop, which negatively affects their accuracy. There is therefore a need to measure IR drop in a more accurate and efficient manner.

DETAILED DESCRIPTION

The IR drop for a portion of a circuit may include a voltage drop across resistance, and may include a product of current I passing through resistance with a resistance value R. In order to determine IR drop for a circuit in a more accurate and efficient manner, a custom software script produces power maps (that each indicate a time-varying or location-varying distribution of power within an associated portion of the circuit), and these power maps are then used by the neural network to determine an IR drop for each of a plurality of portions of the circuit.

Figure 1:
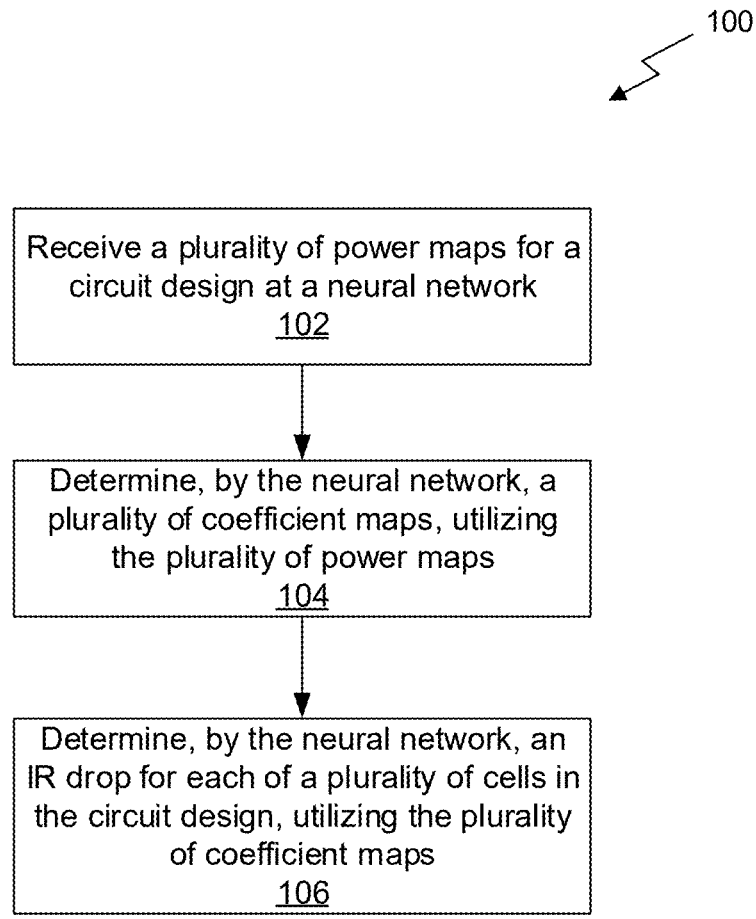
FIG. 1 illustrates a flowchart of a method of determining IR drop, in accordance with an embodiment.

FIG. 1 illustrates a flowchart of a method 100 of determining IR drop, in accordance with an embodiment. The method 100 may be performed in the context of a processing unit and/or by a program, custom circuitry, or by a combination of custom circuitry and a program. For example, the method 100 may be executed by a GPU (graphics processing unit), CPU (central processing unit), or any processor described below. Furthermore, persons of ordinary skill in the art will understand that any system that performs method 100 is within the scope and spirit of embodiments of the present disclosure.

As shown in operation 102, a plurality of power maps for a circuit design are received at a neural network. In one embodiment, the plurality of power maps may be provided as input to the neural network. In another embodiment, the circuit may include a hardware circuit (e.g., a digital integrated circuit, etc.).

Additionally, in one embodiment, each of the plurality of power maps may include a two-dimensional image-based representation of power dissipation within the circuit at a particular instance of time. For example, each of the plurality of power maps may represent the power dissipation of the entire circuit at a given time. In another example, each of the plurality of power maps may be obtained by running one or more analysis tools to determine the power dissipated by each of a plurality of cells within the circuit.

Further, in one example, each of the plurality of cells may include a subset of the overall circuit design (e.g., a predetermined group of transistors within the circuit, etc.). In another example, the power dissipated by each of the plurality of cells within the circuit at a predetermined point in time may be combined to create the power map representation of the circuit for that predetermined point in time.

Further still, in one embodiment, each of the plurality of power maps may be spatially and temporally correlated. In another embodiment, the neural network may include a convolutional neural network (CNN). For example, the CNN may include a shift invariant or space invariant artificial neural network (SIANN) that implements a shared-weights architecture and translation invariance characteristics. In another example, the CNN may include a regularized version of multilayer perceptrons. In yet another example, the CNN may include a modified U-Net (e.g., a U-Net CNN modified to perform IR drop calculations, etc.). In still another example, the CNN may include a three-dimensional CNN layer and a regression layer.

Also, as shown in operation 104, a plurality of coefficient maps are determined by the neural network, utilizing the plurality of power maps. In one embodiment, the plurality of power maps may be input into a three-dimensional (3D) CNN model/layer that is included within the neural network. In another embodiment, the 3D CNN may consider a subset of the plurality of power maps during a single iteration (e.g., instead of the entire plurality of input power maps). This may result in more accurate calculations when compared to analyses that address an entire power map set.

In addition, in one embodiment, the 3D CNN may determine the plurality of coefficient maps within the neural network, utilizing the plurality of power maps. In another embodiment, each of the plurality of coefficient maps may indicate a time-varying distribution of power within a portion of the circuit design. In yet another embodiment, each of the plurality of coefficient maps may be calculated for/associated with a particular region (e.g., a specific cell) within the circuit design. In still another embodiment, each of the plurality of coefficient maps may include a weight/multiplication factor that is used to multiply cell-level power values to get IR drop at a cell-level granularity.

Furthermore, as shown in operation 106, an IR drop is determined for each of a plurality of cells in the circuit design, utilizing the plurality of coefficient maps. In one embodiment, the plurality of coefficient maps may be input into a regression model/layer that is included within the neural network. In another embodiment, the regression model may be located immediately before an output layer of the neural network.

Further still, in one embodiment, for each of the plurality of coefficient maps, the regression layer may multiply the coefficient map with instance-level features of the associated cell (e.g., the cell for which the coefficient map is calculated for/associated with) to determine an IR drop for the associated cell. This may enable the calculation of IR drop at a cell-level granularity.

Also, in one embodiment, the regression model may output the IR drop for each cell within the circuit design. For example, each of the plurality of cells may include a subset of the overall circuit design (e.g., a predetermined group of transistors within the circuit, etc.). In another embodiment, the IR drop for a cell may include the electrical potential difference between two ends of a conducting phase within the cell during a current flow. For example, the IR drop may include a voltage drop across resistance, and may include a product of current I passing through resistance with a resistance value R.

In this way, the neural network may output individual IR drops for each cell within overall circuit design. These IR drops may be used to improve the timing and functionality of the circuit design, thereby improving the performance of the circuit itself. Additionally, by identifying coefficient maps and using these coefficient maps to determine an IR drop for cells within the circuit design, IR drop may be more accurately determined in a more efficient manner, which may improve a performance of one or more computing devices determining IR drop for the circuit design.

In one embodiment, one or more of the determining of the coefficient maps, the determining of the IR drop, and the performing of vector profiling may be performed at a cloud-based computing environment.

Additionally, in one embodiment, the 3D CNN of the neural network may be used to perform vector profiling. For example, a vector may include a test case on a real workload that illustrates the multi-cycle changes of activity of a circuit. In another example, multiple vectors may be provided as input, where each vector has multiple clock cycles.

Further, in one embodiment, each vector may illustrate the particular power activities of the circuit at a particular point in time. For example, each cycle (e.g., a predetermined time) within a vector may have a different amount of power distribution within the circuit when compared to other cycles. In another embodiment, vector profiling may include reducing a multi-cycle vector (e.g., a vector with multiple cycles) into a subset of cycles. For example, the subset may include worst-case cycles that illustrate the worst-case IR drop within the vectors.

Further still, in one embodiment, information (e.g., results) from the 3D CNN of the neural network may be used to assist in the reduction of the multi-cycle vector. For example, the 3D CNN may be used to reduce the number of vectors to be analyzed to determine a worst-case IR drop. In another embodiment, vector profiling may include a plurality of stages. In yet another embodiment, a first stage may take an input vector with many cycles and may filter out cycles based on their average power.

For example, the vector may be converted into slices (e.g., a portion of the vector during a predetermined number of clock cycles). In another example, slices may be eliminated based on a comparison to an average slice power. For instance, slices that have a calculated power below an average calculated power for all the slices may be discarded.

Also, in one embodiment, a second stage may score each of the cycles resulting from the previously performed filtering. For example, CNN model inference may be run to predict an IR drop for each slice. In another example, each slice may be scored based on its corresponding predicted IR drop.

In addition, in one embodiment, a third stage may rank slices based on the predicted IR drop for each slice. In another embodiment, this ranking may generate a top predetermined number of slices (e.g., for a predetermined region of the circuit design). In another embodiment, results of the vector profiling may include a subset of cycles within the circuit design that have the highest IR drop. For example, these cycles may be input into an analysis tool to predict the actual IR drop within those cycles. In another example, this may identify the most relevant IR drop cases within a plurality of clock cycles.

In this way, an accuracy of the most relevant IR drop cases may be increased utilizing vector profiling with assistance from the 3D CNN of the neural network.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
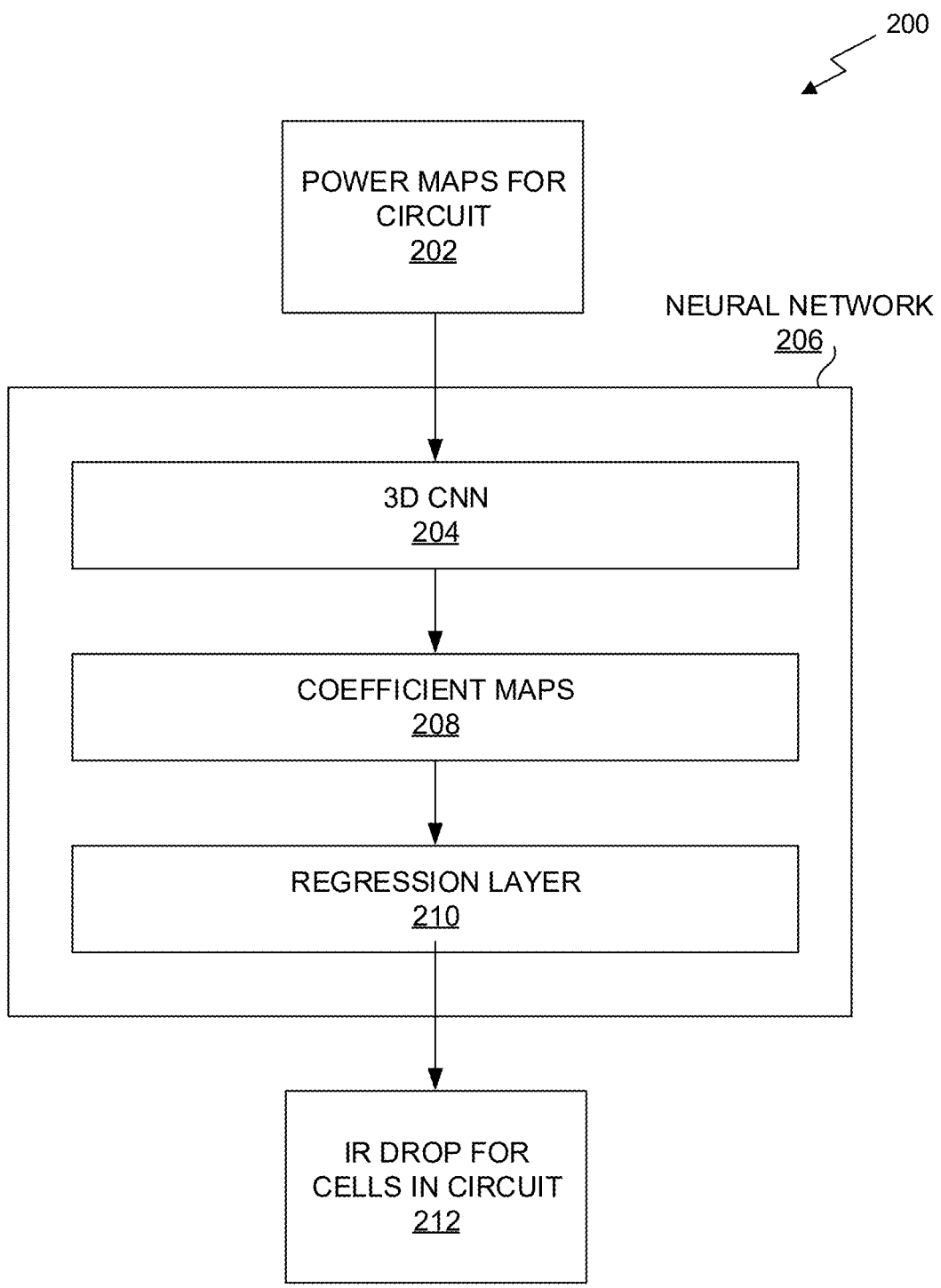
FIG. 2 illustrates an exemplary neural network environment for determining IR drop within a circuit design, in accordance with an embodiment.

FIG. 2 illustrates an exemplary neural network environment 200 for determining IR drop within a circuit design, according to one exemplary embodiment. As shown, a plurality of power maps 202 for a circuit design are input into a 3D CNN 204 of a neural network 206. The 3D CNN 204 determines a plurality of coefficient maps 208 for a plurality of cells within the circuit design utilizing the plurality of power maps 202.

Additionally, the plurality of coefficient maps 208 are input into a regression layer 210 of the neural network 206. Using the plurality of coefficient maps 208, the regression layer 210 determines the IR drop 212 for each of the plurality of cells within the circuit design, which is then output by the neural network 206. In one embodiment, all or a portion of the neural network 206 may be located at a local computing device and/or within a cloud computing environment.

In this way, by identifying and using the plurality of coefficient maps 208 to determine the IR drop 212 for cells within the circuit design, IR drop may be determined by the neural network 206 in a faster and more efficient manner when compared to current solutions.

Figure 3:
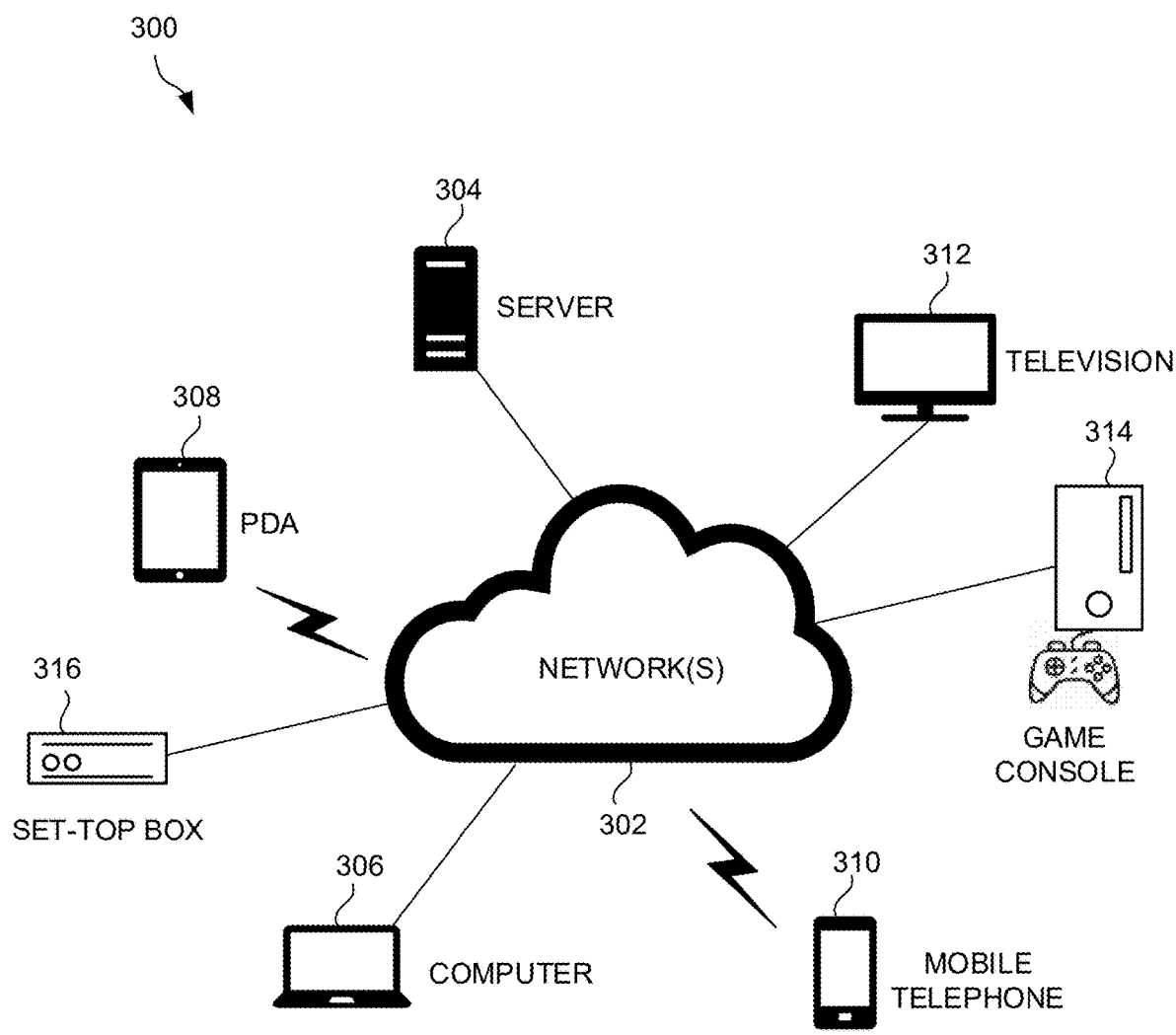
FIG. 3 illustrates a network architecture, in accordance with an embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, a game console 314, a television set-top box 316, etc.

Figure 4:
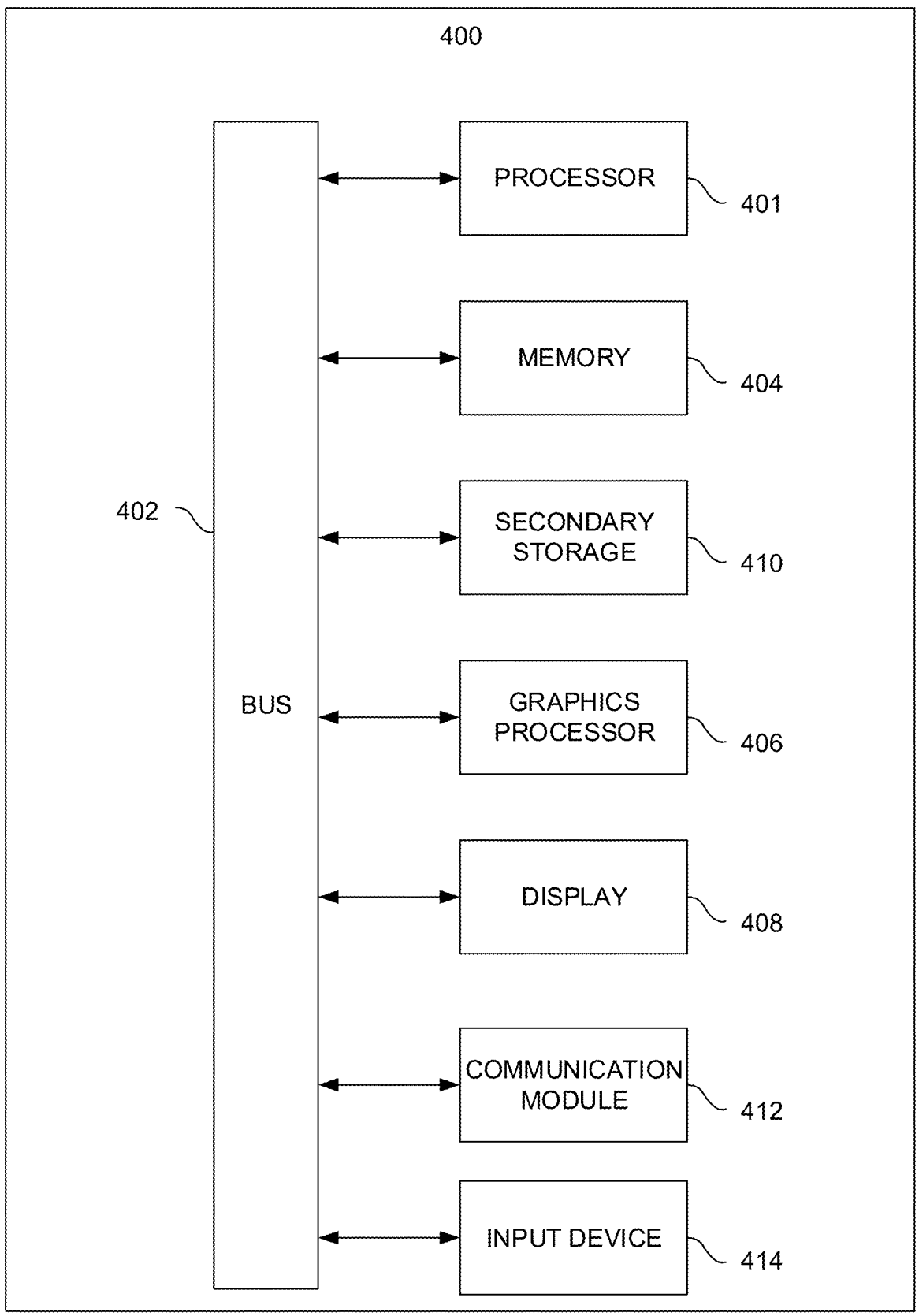
FIG. 4 illustrates an exemplary system, in accordance with an embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As also shown, the system 400 may include one or more input devices 414. The input devices 414 may be wired or wireless input device. In various embodiments, each input device 414 may include a keyboard, touch pad, touch screen, game controller (e.g. to a game console), remote controller (e.g. to a set-top box or television), or any other device capable of being used by a user to provide input to the system 400.

MAVIREC: ML-Aided Vectored IR-Drop Estimation and Classification

Vectored IR drop analysis is a critical step in chip signoff that checks the power integrity of an on-chip power delivery network. Due to the prohibitive runtimes of dynamic IR drop analysis, the large number of test patterns must be whittled down to a small subset of worst-case IR vectors. Unlike the traditional slow heuristic method that selects a few vectors with incomplete coverage, MAVIREC leverages machine learning techniques—3D convolutions and regression-like layers—for fast analysis, recommending a larger subset of test patterns that exercise worst-case scenarios.

IR drop analysis estimates the deviation from the ideal supply voltage to meet IR drop constraints across all corners and scenarios. Today, estimating voltage at each node amounts to solving systems of linear equations with billions of variables, with runtimes of several hours on industrial-scale designs even for static analysis. To model switching patterns under real workloads, designers perform switching activity simulation for several vectors, each spanning a few hundred thousand cycles. Then, IR drop analysis in industry is performed for a subset of switching patterns due to prohibitive runtimes. This subset contains a small number of worst-case slices of all vectors, chosen by a vector profiling flow, where a slice corresponds to continuous multicycle time windows of a vector.

There is a need for a fast and accurate IR drop estimator to profile large sets of vectors and accurately recommend worst-case slices of the full vector.

MAVIREC is a fast, accurate, and novel vector profiling system that recommends worst-case IR drop switching patterns with high coverage of IR hot spots, using a fast and accurate under-the-hood IR estimator. The estimator uses an ML architecture, and introduces 3D convolutional layers in the model that capture the sparse temporal switching activities, and also employs a regression-like output layer that enables IR-drop prediction at instance-level granularity. In addition, the use of direct instance-level features as a part of this regression equation enhances transferability and provides model interpretability.

MAVIREC features include:
A novel tailored U-Net-based ML model for dynamic IR drop estimation, achieving a speedup over industrial flows, at the per-instance (i.e., per-logic-gate) granularity using 3D convolutions for capturing switching activity.
A recommender system that uses fast ML inference to select hundreds of slices when compared to conventional flow that selects far fewer.
An accurate system for profiling long vectors and maximizing regional coverage on industrial scale designs.

MAVIREC for Vectored Dynamic IR Estimation

In one embodiment, the MAVRIC scheme first performs feature extraction and then uses a trained model for IR drop estimation.

Feature Extraction

The MAVIREC ML model uses two types of features, differentiated by the method in which they are represented:
Instance-level power and effective distance to via stack
Spatial and temporal full-chip tile-based power maps, and spatial time-invariant resistance maps Table 1 lists the features used in an exemplary ML model, encapsulating power information, the local PDN (power delivery network) topology, and switching activity. These features are first extracted from the design environment. Lowercase symbols are instance-level and uppercase are at the tile-level.

TABLE 1

| Features |
| --- |
| Internal Power: $p_i$, $P_i$ |
| Leakage Power: $p_l$, $P_l$ |
| Switching Power: $p_s$, $P_s$ |
| Toggle Rate Scaled Power: $p_r$, $P_r$ |
| Overlap Power: $p_{ol}$, $P_{ol}$ |
| Total Power: $P_{tot}$, $P_{tot}$ |
| Effective Distance: r, R |
| Toggle Power at Each Time Step: $p_t$, $P_t$ |

Ground Truth Training Labels
Instance-Level IR drop: IRi, NA (heat map only)

Figure 5:
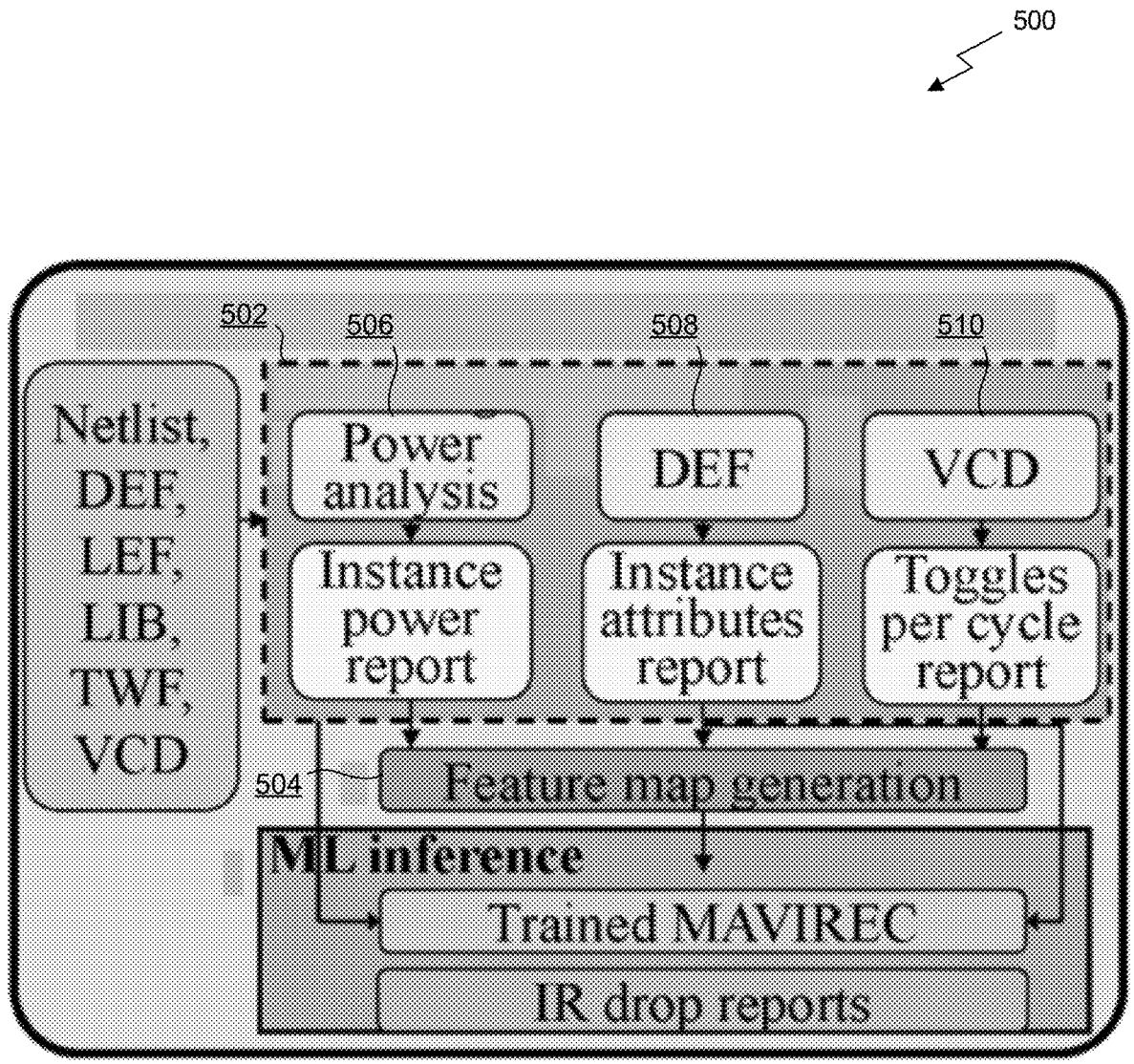
FIG. 5 illustrates an exemplary two-part process of extracting instance-level features and generating 2D spatial and temporal feature maps, in accordance with an embodiment.

FIG. 5 illustrates an exemplary two-part process 500 of extracting instance-level features 502 and generating 2D spatial and temporal feature maps 504.

Instance-level Feature Generation Three tools are used to extract instance-level information from the design:
1) A power analysis tool 506 to generate a per-instance switching ($p_s$), internal ($p_i$), and leakage power ($p_l$) report.

2) A parser tool 508 to extract from the DEF (a) instance locations and (b) effective distance of an instance to power rail via stacks in the immediate neighborhood.
3) A tool 510 that extracts the times when instances toggle, from the VCD file for each slice.

In addition to $p_l$, $p_s$, $p_i$, and r, there are three other instance-level features which are derived. The toggle rate scaled and total power are given by $p_r = p_l + \tau_i(p_s + p_i)$ and $p_{tot} = p_l + p_s + p_i$ respectively, where $\tau_i$ is the average toggle rate of the instance in the specified slice. The overlap power $p_{ol}$ sums up the pr of all neighboring instances that share the same timing window.

Generation of 2D Spatial and Temporal Maps as Features

The map creation step 504 performs a spatial and temporal decomposition of the per-instance features. For the spatial-tile based features, the location of each instance is associated with its corresponding power/effective distance attributes to create 2D distributions of these attributes at a fixed granularity (tile size). For each instance-level feature in Table 1, its tile-based counterpart adds per instance power-related features, and takes the maximum effective distance over all instances, in the tile.

For dynamic IR drop analysis, temporal power maps are also considered. To generate $p_t$ (the power of an instance at each time step), the n-cycle time window is divided into n×t time steps, where n may be predetermined by a designer as the window size of interest and t is a hyperparamter to be tuned. The power of an instance at time step j where n×t=100 as an example is given by:

$$p_t(j) = \sum_{j=1}^{100} p_l + b_j(p_i + p_s)$$

where the Boolean variable $b_j$ is one only if the instance toggles at time step j. Thus, time-decomposed power maps may be created at each time step using the toggle information and timing windows. All features in Table 1 may be normalized between 0 and 1 and may be inputs to the trained ML model. Normalization scales the input by a predetermined constant that is defined for the technology, e.g., the maximum supply voltage or current.

MAVIREC Architecture

Figure 6:
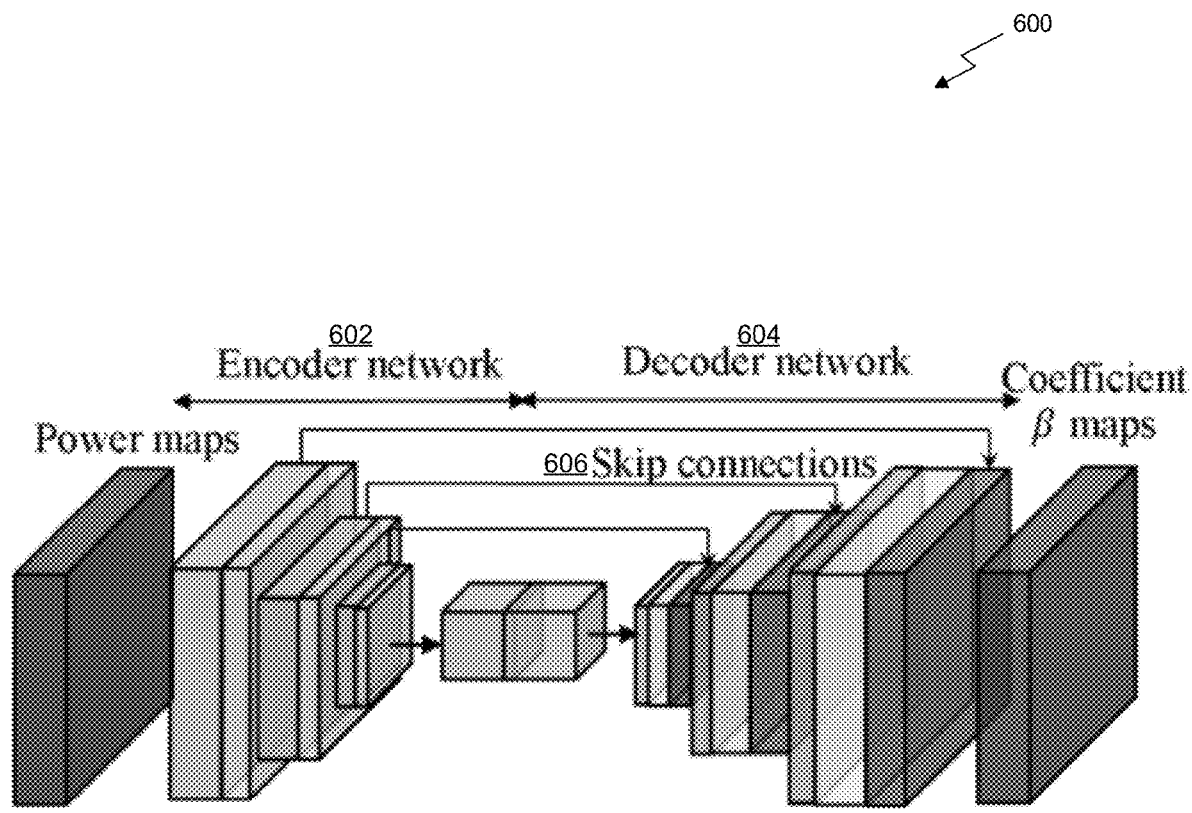
FIG. 6 illustrates the structure of MAVIREC for vectored dynamic IR drop estimation, in accordance with an embodiment.

FIG. 6 illustrates the structure 600 of MAVIREC for vectored dynamic IR drop estimation. It consists of a first subnetwork 602 for encoding (downsampling) and a second subnetwork 604 for decoding (upsampling), with skip connections 606 between the networks. The skip connections 606 use a concatenation layer to incorporate information from an early layer into a deeper stage of the network, skipping intermediate layers, and appends it to the embedding along the z-direction. This architecture may be based on fully convolutional (no fully connected layers) U-Net models used for image segmentation. The convolutional and max-pool layers of the U-Net capture local and global spatial neighborhood features.

There are two key differences from a standard U-Net that are crucial for overcoming its limitations:
1. 3D convolutional layers in the encoding path that capture temporal simultaneous switching activity.
2. A regression-like layer at the end of the decoder that incorporates instance-level input features and the instance-level IR drop IRi using i, the coefficient matrix predicted by the U-Net like structure.

3D Convolutional Layer in the Encoder

Unlike a 2D convolutional layer that uses all input channels during convolution, a 3D convolutional layer restricts the number of channels to the specified filter size in the channel dimension, thus considering only a small local window of channels. When all the temporal power maps are taken together as channels in a regular 2D convolutional layer, due to zero-dominance in the data, the model fails to capture key non-zero toggle activity regions and time steps. Intuitively, a small local window of channels which a 3D convolutional layer considers would better capture simultaneous and sparsely-distributed switching activity. Therefore, MAVIREC uses a 3×3×3 filtered 3D convolutional layer in the encoding path instead of a regular 3×3 2D convolutional layer as in U-Net. MAVIREC has n×t+7 tile-based channels (Table 1):

n×t temporal power maps (Pt) to the encoder network
7 tile-based spatial features ($P_i$, $P_l$, $P_s$, $P_r$, $P_{ol}$, $P_{tot}$, R), Where n×t represents the number of time steps. MAVIREC consists of four 3D convolutional layers and three 3D max pool layers in the encoder network and four 2D convolutional layers and three upsampling layers in the decoder network. Since the decoding path uses 2D convolutions, the interface between the 3D embedding in the encoder and the 2D embedding in the decoder sums up the embedding along the temporal dimension through concatenation/skip connections.

Regression-Like Layer in the Decoder

To enable IR drop prediction at a per-instance level, MAVIREC leverages a regression-like layer at the end of the decoder path that uses instance-level input features and multiplies them with the predicted coefficients (Bi) by the U-Net-like structure.

The predicted coefficients are based on the n×t+7 spatial and temporal tile-based channels as input. The coefficient predicted for every tile is then multiplied with the per-instance feature values. This architecture provides three key advantages over prior ML-based solutions:
1. Improved transferability compared to prior art, as the model uses both instance-level features directly and tile-level features to predict IR drop at a per-instance level. The instance-based features help capture fine-grained variations in the data that is otherwise lost due to the averaging nature of U-Net convolutions. Instead of learning the IR drop values directly, the U-Net-like structure learns the relationship (Bi) between the features and the IR drop values, which is universal across designs.
2. Improved instance-level IR drop predictability compared to prior art, which is useful for instance-based IR drop mitigation.
3. Model interpretability as the predicted coefficients are the weights associated with each feature. The coefficients correspond to feature sensitivity and allow designers to assess the root cause of an IR drop violation.

A trained MAVIREC model is reusable, without the need for retraining when faced with new designs/vectors for a given technology. Although the prediction is on an instance level granularity, it is not necessary to loop through all instances to estimate the IR drop. Instead, a location matrix is defined that creates a mapping between each instance and its corresponding tile-based coefficient. This mapping eliminates the loop by using element-wise matrix multiplication which is accelerated on GPUs.

MAVIREC for Vector Profiling

Input vectors in real workloads can typically have many thousands of cycles, which corresponds to several thousand slices. These slices (e.g., of twenty-cycle windows, etc.) each form inputs to the rail analysis step for IR drop estimation. Given the runtimes of industrial flow rail analysis, it is near-impossible to run rail analysis on all slices. Using a brute force approach, where MAVIREC is used as a fast IR drop estimator, is not a viable solution either as each inference involves extracting temporal features at recurring runtime costs for each of the slices. This calls for techniques to select a large set (e.g., 70-200) of candidate slices that represent the design and worst-case IR drop vector. In contrast, industrial flows are limited to 3-5 slices due to IR analysis run-times.

Figure 7:
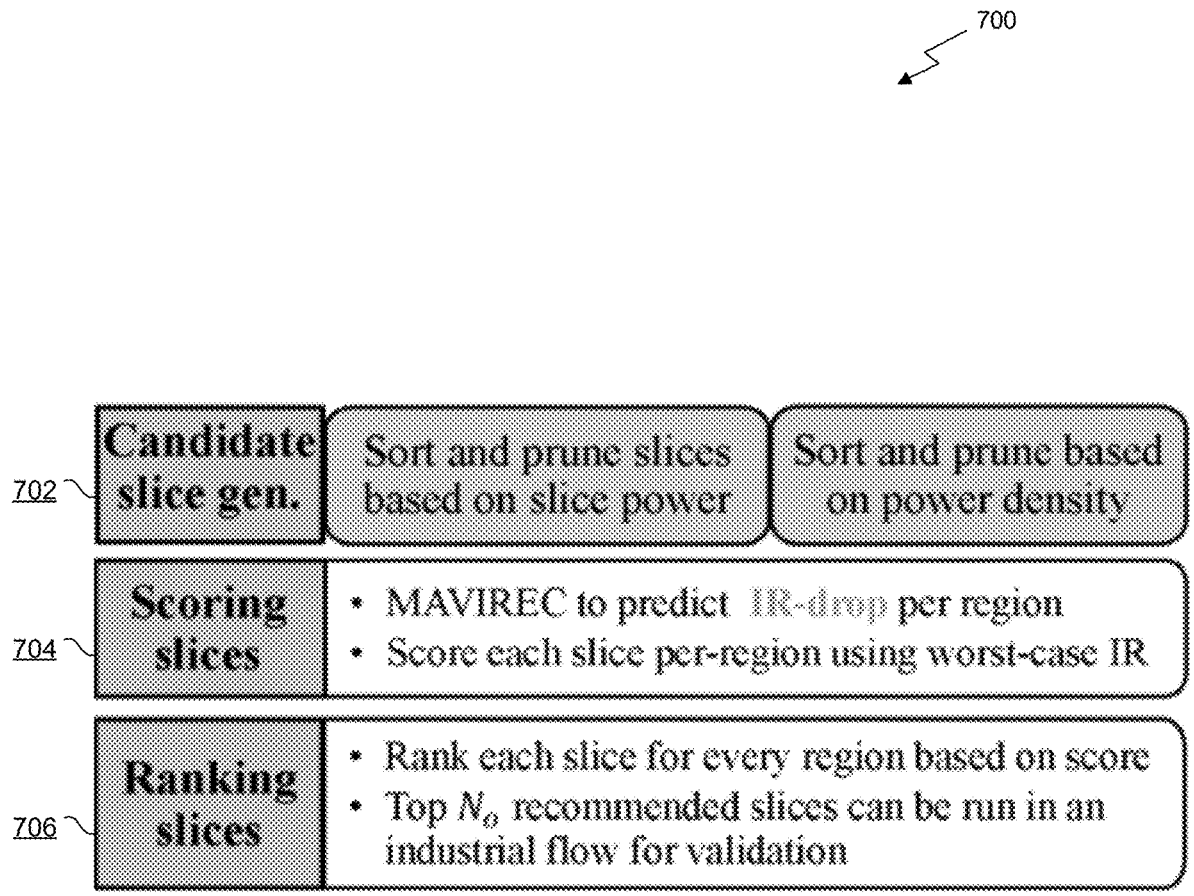
FIG. 7 illustrates an exemplary MAVIREC vector profiling flow, in accordance with an embodiment.

FIG. 7 illustrates an exemplary MAVIREC vector profiling flow 700. The inputs are per-instance leakage, switching and internal power $p_l$, $p_s$, and $p_i$, region size w×l, chip size $W_c \times L_c$, the number of slices to select at each of the two stages of candidate generation given by $N_a$ and $N_r$, and $N_o$ is the number of top rank slices to report at the end of the profiling. The number of regions in the design is given by $W_r \times L_r$ where $W_r = W_c/w$ and $L_r = L_c/l$.

The vector profiling flow 700 is a three-step process which consists of (i) candidate generation 702 (two stages), (ii) scoring 704, and (iii) ranking 706. At each stage of candidate generation, slices are pruned based first on average power and then on regional power next. The remaining slices are scored using the worst-case IR drop as a metric and are ranked using a technique that maximizes regional coverage.

Candidate Slice Generation

This step of the vector profiling flow consists of two stages. In the first stage, in each of the vectors, there are thousands of slices with near-zero switching activity. Therefore, in the first stage of candidate generation 702 the set of slices is sorted and pruned based on the average power of each slice. Pruning at this stage saves time by preventing feature extraction for slices that are obviously not IR-critical. The pruned and sorted list, $C_{Na}$, has hundreds of potential candidates to move on to the next stage of flow (much more than 3-5 in industrial flows).

In the second stage, since the IR drop of an instance depends on the switching activity of an instance and its neighborhood, power per region is vital for IR drop. Therefore, in the second stage of candidate generation 702, the power per region in the design is calculated and the $C_{Na}$ candidate slices are ranked in each region. The top Nr are extracted from each region. This results in a list, $C_{Nr}$, of $N_r \times W_r \times L_F$ candidate slices and $C_{Nc}$ is the list of $N_c$ unique candidates from $C_{Nr}$.

Candidate Slice Scoring and Ranking

At the slice ranking step 706, each of the Ne generated candidates are scored based on worst-case IR drop of each slice in each region. To perform this, for each candidate slice $C_{Nc}$ all the required features required (Table 1) for the ML inference are generated. The inference engine in MAVIREC is then used to generate a full-chip IR drop as detailed in line 19 and Section II-B. The worst-case IR drop across the chip is used to score each slice. This results in $N_c \times W_r \times L_r$ score values in IRscore. Each candidate is then ranked based on the worst-case IR drop and its corresponding region is recorded. Only those unique $N_o$ candidates that correspond to the worst-case IR drop of a previously uncovered region are stored in $C_{No}$.

MAVIREC includes a fast and accurate vector profiling system that recommends a set of worst-case IR drop switching patterns using an ML-based IR drop estimation. MAVIREC can profile hundred thousand-cycle vectors in under 30 minutes (4× speedup vs. industrial flows) on industrial designs and captures regions that were missed by industrial flows. MAVIREC's inference for IR drop estimation is ten times faster than industrial flows at the cost of a mere 4 mV error. In one embodiment, the ML inference engine can be adopted for both vectorless dynamic and static IR drop analysis.

In one embodiment, techniques for prediction of IR drop 'hotspots' (potential circuit failure points) may also be provided. The predictions may be applied to revise circuit structure placements and/or power grid distribution for complex circuits.

Convolutional neural networks (CNNs) are well suited to classifying features in data sets modelled in two or three dimensions. This makes CNNs popular for image classification, because images can be represented in computer memories in three dimensions (two dimensions for width and height, and a third dimension for pixel features like color components and intensity). For example a color JEG image of size 480×480 pixels can be modelled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc.). Image classification is the task of taking an input image and outputting a class (a cat, dog, etc.) or a probability of classes that best describes the image.

CNNs typically input data in the form of vectors, pass the data through a series of convolutional transformations, non-linear activation functions, and pooling operations, and pass the results to an output layer to generate the classifications.

CNNs are thus typically utilized for image classification. Unconventionally, a machine learning method and system is disclosed herein to utilize CNNs to perform fast and accurate estimation of IR drop. Cell power consumption is transformed into power maps for different sub-intervals of a clock period and provided as input to the CNN. The CNN architecture transforms the power maps into a maximum-valued output prediction of IR drop 'hot spots'. This structure effectively identifies the logic cells in the circuit structure resulting in worst IR drop during an entire clock cycle.

Logic cell information that may be utilized for IR drop prediction includes cell internal power, cell switching power, cell leakage power, and cell toggle rate. Timing information may also be utilized, such as minimum arriving time for signals at the cell and maximum arriving time for signals at the cell. In some cases, additional cell information may also be utilized, such as cell capacitance, cell slew, cell coordinates after placement, and path resistance. The power characteristics of a cell may be scaled according to the toggle rate. The toggle-rate-scaled cell power is derived as follows: (internal power+switching power+leakage power) *toggle rate.

Herein "cell" refers to a sub-circuit of a larger circuit structure. A cell is often, but not necessarily, defined in a cell library and may be selected and manipulated as a unit along with other cells to build up the larger circuit structure.

Figure 8:
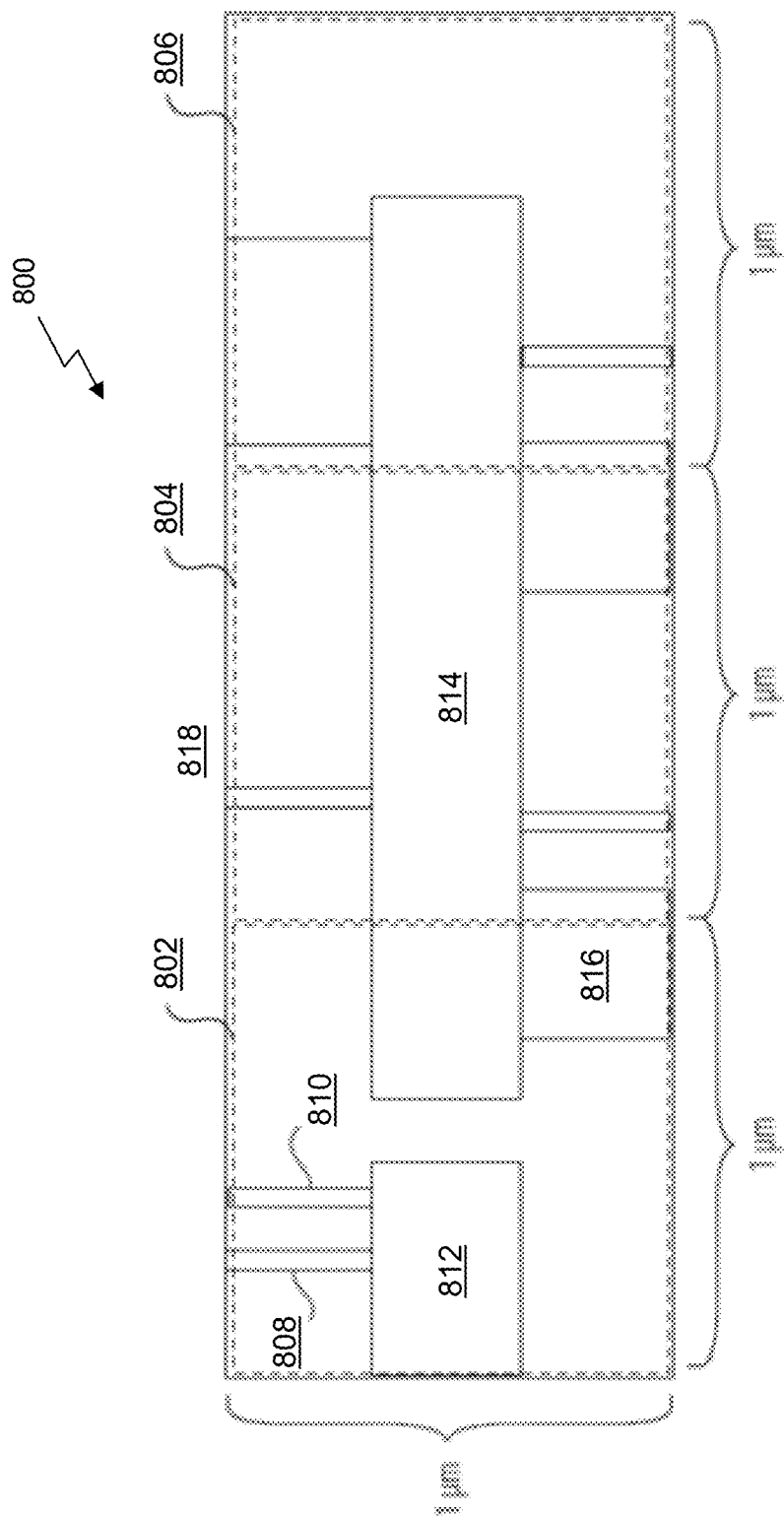
FIG. 8 illustrates an example partitioned circuit structure, in accordance with an embodiment.

Computation complexity is reduced by performing IR drop predictions at a grid-level granularity instead of a cell-level granularity. Cell power is averaged or otherwise amortized over the grid tiles they overlay, even partially, as FIG. 8 depicts in one example. Exemplary grid tile dimensions are 1 um$^2$ although other areas can be used.

Figure 9:
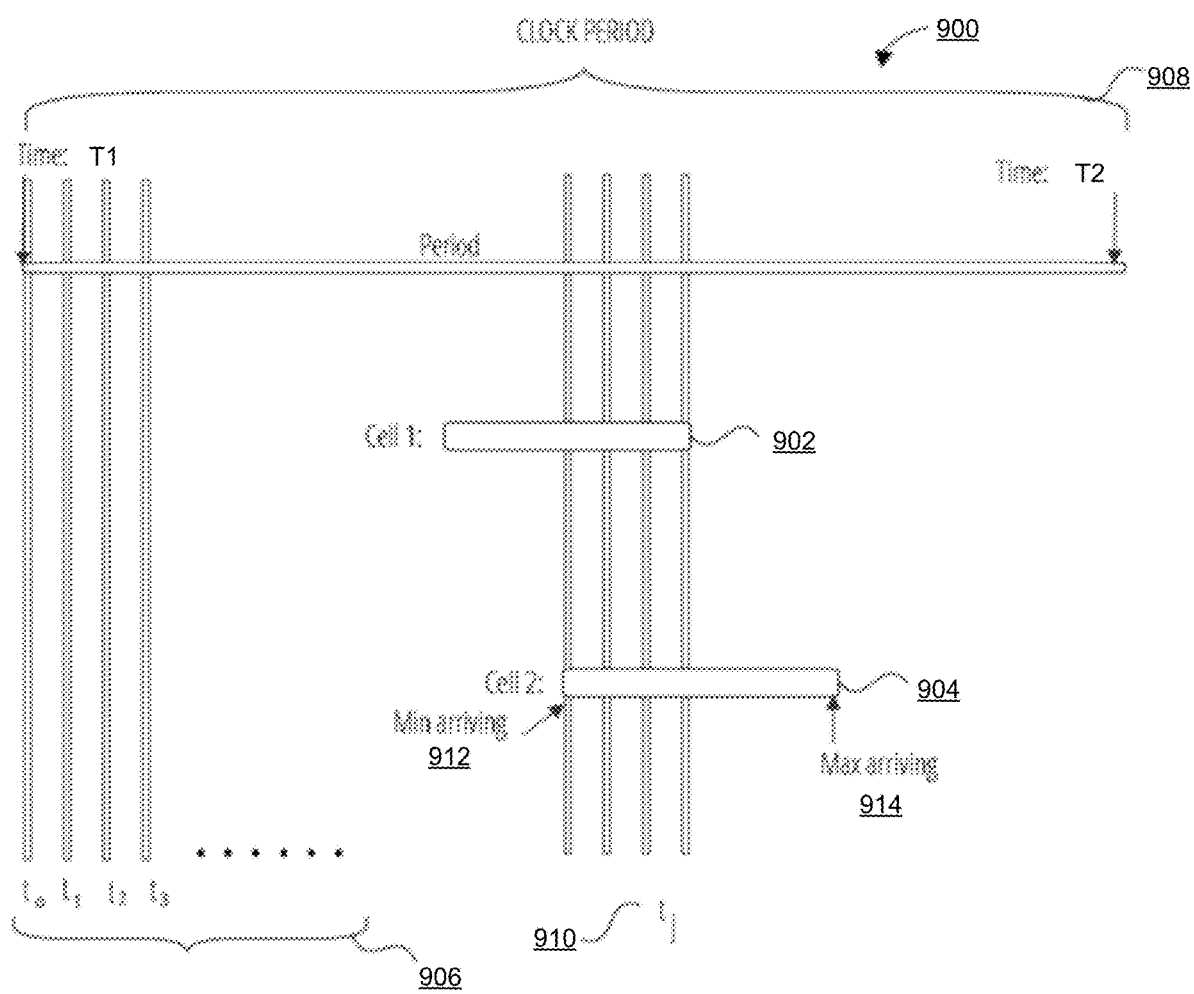
FIG. 9 illustrates a timing diagram, in accordance with an embodiment.

The power consumption of a particular cell is mapped into $N \geq 2$ power maps for $N \geq 2$ timing window sub-intervals of the cell in a single clock period. Each power map is assigned a unique time point in the clock period. The N time points span the clock period of the circuit under evaluation, and time points of each pair of neighboring maps have the same time discrepancy (separation interval), as depicted in FIG. 9. For each power map, each cell is analyzed and the cell power is added to the power map in the grid tiles overlaid by the cell when the sub-interval for the power map falls within the cell's timing window. For example, in FIG. 9, during time intervals $t_0$ to $t_3$, the power for cell 1 and for cell 2 is not contributive. However the power for these cells is contributive to time interval $t_j$ because $t_j$ overlaps the operational timing window of those two cells. In this way, every power map only includes the power of cells that activate at or within the corresponding sub-interval in the clock period.

If a cell is active in a particular sub-interval, the power consumed and/or dissipated by that cell may be amortized (e.g., averaged) into each grid tile that the cell overlaps in the power map for that sub-interval. This allows for the grid lines to be drawn uniformly, without consideration of how they cut through the cells. For example, if a cell overlaps three grid tiles, it's power may be treated as contributing equally to each of them, regardless of how much or little of the cell circuitry actually contributes power in each overlapped grid tile. In this case, each grid tile may be apportioned a third of the power contribution from that cell during a sub-interval that the cell is turned on. In other embodiments, the cell contribution to each grid tile may be apportioned based on a characterization of the internals of that cell. This approach, though more computationally complex, may improve the accuracy of the IR drop predictions. Cell characterization may be based on the positions of transistors, internal power number, and leakage power number, for example. Simulations of the cell may also be generated to determine where within the cell powers is consumed or dissipated, and to what extent.

Figure 10:
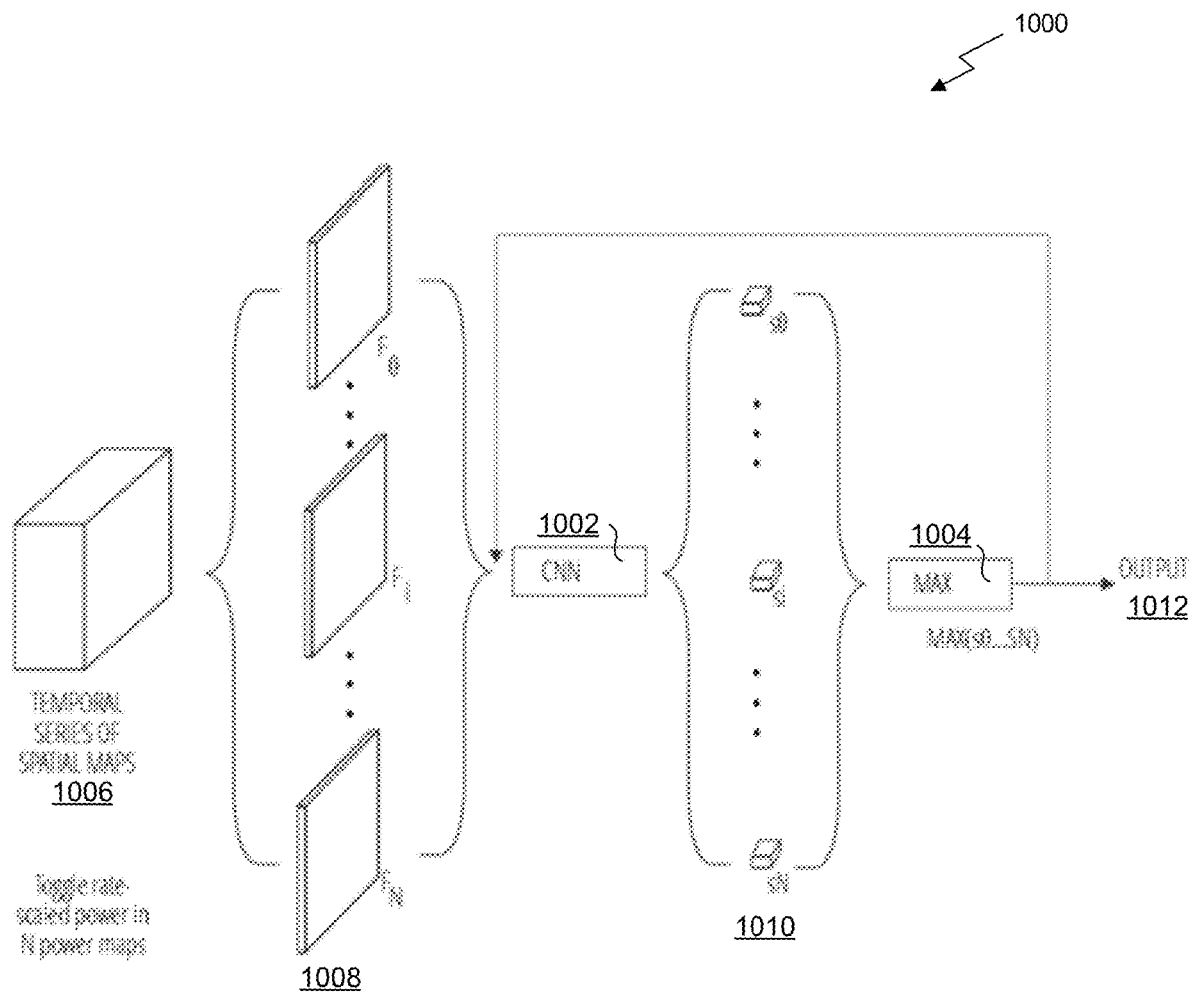
FIG. 10 illustrates a machine learning and inference system, in accordance with an embodiment.

FIG. 10 depicts a CNN architecture to process a sequence of power maps. Each sub-interval $t_i$ within the clock period from FIG. 9 has a corresponding input power map composed of grid tiles, e.g., a set of 30×30 tiles. The CNN processes the power maps for all sub-intervals and selects the maximum or highest valued subset of output results as the final IR drop prediction(s).

Figure 11:
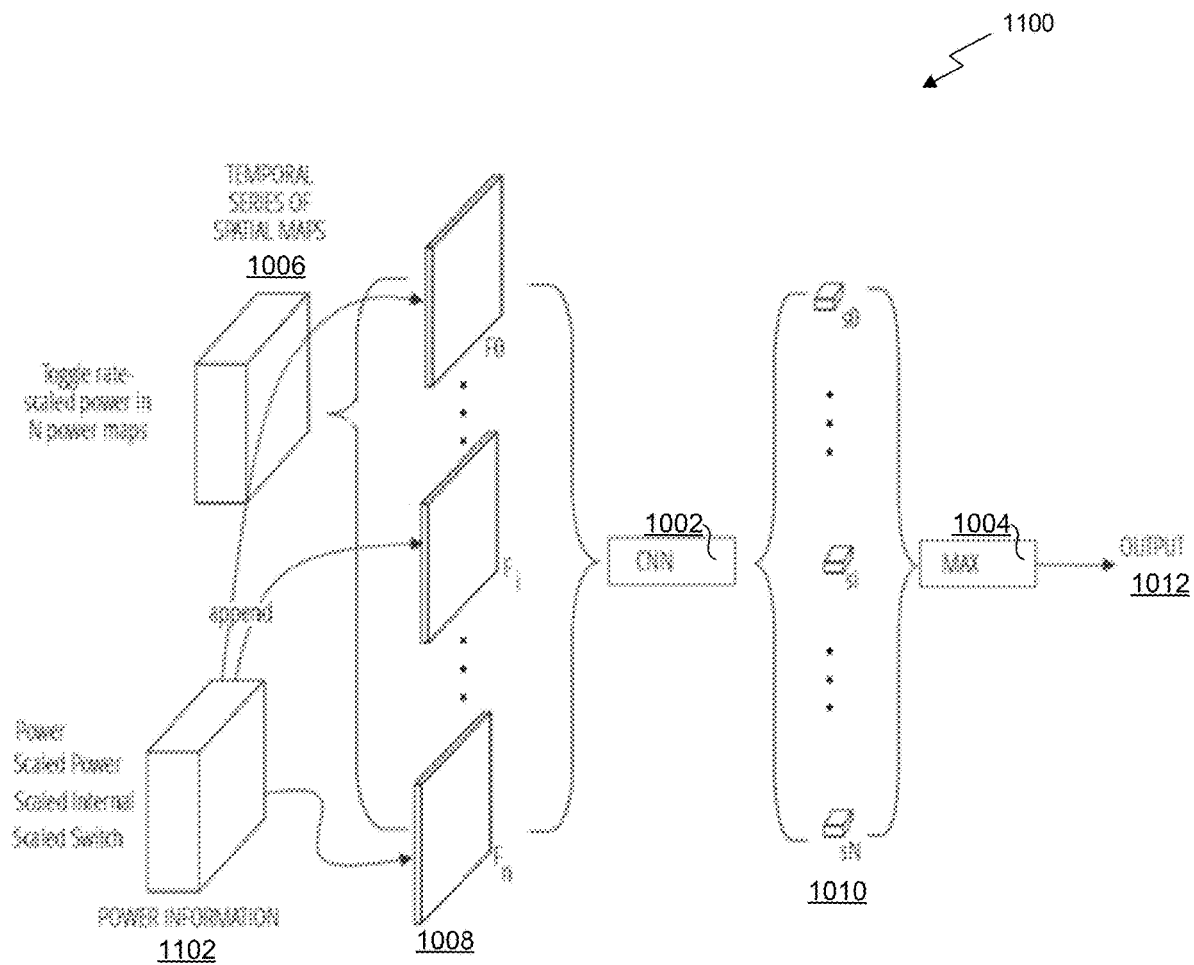
FIG. 11 illustrates a modified version of the machine learning and inference system in FIG. 10, in accordance with an embodiment.

Additional power information may be included in the depth of each power map input to the CNN, as FIG. 11 shows. The additional power information may result in a more complex but more accurate computation of IR drop.

FIG. 8 depicts an example partitioned circuit structure 800 partitioned into a grid 818 comprising grid tiles (grid tile 802, grid tile 804, and grid tile 806). The partitioned circuit structure 100 includes a plurality of cells with some spanning between grid tiles. A power map is formed for the grid 818 by amortizing the power consumption of the cells within the set of grid tiles that comprise portions of the cells, during each sub-interval of a clock period. For example, grid tile 802 may power cell P1 808, cell P2 810, and cell P3 812 as well as cell P4 814 and cell P5 816 during one sub-interval of the clock period, referred to herein as a window or power window. Because portions of cell P4 814 are included in grid tile 802, grid tile 804, and grid tile 806, the power consumption representation for cell P4 814 in each of those grid tiles is divided by three. Because portions of cell P5 816 are included within grid tile 802 and grid tile 804, the power consumption representation of the cell P5 816 in each of those grid tiles is divided by two. The total power consumption for grid tile 802 during the power window is thus the sum of these contributions: $P_{tile}=P1+P2+P3+P4/3+P5/2$. A similar calculation is performed for each grid tile (grid tile 802, grid tile 804, and grid tile 806) during the power window, and the total power for each grid tile of the grid 818 is formulated as a matrix in the form of a power map for the power window.

In the partitioned circuit structure 100, each of the grid tiles have a width and height of 1 μm making the area of the grid tiles 1 μm². In some embodiments, the grid tiles may not all have the same dimensions, which leads to a more complex but potentially more accurate CNN model. The grid tile area may be selected based on a trade off between computational complexity versus precision in the calculations and may be set to larger or smaller dimensions, depending on the circuit structure.

In some embodiments, the grid tiles may be non-homogenous and may be based on characteristics of the overall circuit that may be determined through analysis. The non-homogenous configuration of the grid sizes may be determined by a set of rules that are applied to all power maps utilized in training the CNN. In one embodiment, there may be a fixed grid configuration for each power map, and within each power map, the grid tiles may be non-homogeneously sized. For example, the grid tile size may be adjusted to finer resolution (in all power maps) around power rails that are more likely to correspond to IR hotspots. The non-homogenous configuration may be defined in a feature map separately from the power maps, and this feature map may be incorporated into the convolutional filter structure of the neural network.

FIG. 9 depicts a timing diagram 900 for cells 1 and 2 during a clock period 908 that last from time T1 (e.g., the beginning of a period) to time T2 (e.g., the end of the period). Cell 1 and Cell 2 do not switch during the time intervals 906 within the clock period 908 because their switching windows (switching window 902 and switching window 904 for Cell 1 and Cell 2, respectively) do not overlap those time intervals. At time interval 910 ($t_j$) both of switching window 902 and switching window 904 indicate that Cell 1 and Cell 2 are powered and the power contributions of those cells to various grid tiles that they overlap are included in the power map for time interval 910. The switching window 904 may begin at the time interval 912 and end at time interval 914.

In this manner, for each sub-interval of the clock period, a power map may be produced by calculating the total power contributed by the cells of the circuit into each grid tile. This results in a temporal series of spatially organized matrices over the clock period. The temporal series of spatial maps reflect the cells that are powered during each of the sub-intervals and that thus contribute to the total power of particular grid tiles at different sub-intervals of the clock period.

Consider the example of a power map comprising a 30×30 set of grid tiles. At every sub-interval of the clock period ($t_0$ $t_1$ $t_2$, etc.) another 30×30 grid (these dimensions may vary by implementation) may be generated. Within each grid, only the contributions from the cells that are turned on and activated at that sub-interval of the clock period are contributing to the total power in each grid tile. In other words, the cells whose switching windows coincide with that sub-interval are counted for the total power calculations for the grid tiles in the power map.

FIG. 10 depicts a machine learning and inference system 1000 in which a convolutional neural network (convolutional neural network 1002) transforms power maps into IR drop predictions. A temporal series of spatial maps 1006 is formed that includes power maps 1008 where the index N corresponds to the time interval of a particular power map. The power maps 1008 are then input to the convolutional neural network 1002 which outputs scalar IR drop predictions 1010 subject to a MAX operator 1004. The MAX operator 1004 selects the maximum value of the scalar IR drop predictions 1010 in order to generate the (scalar) output 1012. Backpropagation of the output 1012 and is then utilized to train the convolutional neural network 1002. The power map for each time interval is indicated by 'F' and a time interval index.

In some configurations, the convolutional neural network 1002 may be configured with four convolutional layers, two pooling layers, and two fully connected layers. The convolutional neural network 1002 may be implemented as a 2D model. The pooling layers may utilize Maxpooling.

Thus, techniques for generating IR drop predictions for a circuit structure may involve generating power maps for a circuit structures that are utilized to train a neural network. The power maps may be generated by partitioning a circuit structure into a grid comprising grid tiles. Then, for each cell of the circuit structure and for each sub-interval of a clock period, the power consumption of the cells may be amortized into a set of grid tiles that comprise portions of the cells, thus forming a set of power maps. These power maps may then be applied to a neural network to generate one or more IR drop prediction for the circuit structure during the clock period.

In some configurations, the neural network is a convolutional neural network. The process of amortizing the power consumption of the cell may involve dividing the power consumption of the cell evenly (averaging) into each tile of the set of grid tiles that comprises a portion of the cell. The IR drop predictions of the neural network may include a single maximal output of the neural network for the set of power maps.

In some configurations, the grid tiles may have uniform dimensions. The power consumption metrics for a cell may include cell internal power, cell switching power, cell leakage power, and cell toggle rate. The neural network may in some embodiments include at least four convolutional layers, two pooling layers, and two fully-connected layers.

A system generating IR drop predictions for a circuit structure may thus include a power map generator for a circuit structure, and a neural network. The neural network may be coupled to receive a set of power maps from the power map generator and to transform the set of power maps into a maximal IR drop prediction for the circuit structure in a clock period. The power map generator may be configured to partition the circuit structure into a grid comprising grid tiles and for each of N sub-intervals of the clock period and to amortize a power consumption of the logic cells into one or more of the grid tiles that includes at least a portion the cells, thus forming the set of power maps.

In some configurations, the power map generator may be further configured to append to the power maps: sub-interval-independent values for scaled power, scaled internal power, and scaled switching power.

In some configurations, the neural network comprises at least two Maxpooling layers, and/or utilize batch normalization, and/or apply backpropagation.

FIG. 11 depicts a machine learning and inference system 1100, a modified version of the machine learning and inference system 1000 that appends four additional values to the tensors for power, scaled power, scaled internal power, and scaled switch power for each interval of the power maps 1008 from a set of power maps 1102. The appended values for power, scaled powers, scaled internal power, and the scaled switched power are calculated independently of the timing window. The appended values are thus the same for power maps at different time intervals. The higher dimensionality of the power maps 1008 in the machine learning and inference system 400 may yield more accurate results but may utilize greater computational resources.

In this manner "undecomposed" power information may be included in each power map. "Decomposed" power information refers to the allocation of power consumption by cells into different sub-intervals of the clock cycle, whereas "undecomposed" power information refers to the power consumption of cells across the entire clock cycle. The undecomposed power information may function as a depth parameter when the power map is vectorized for input to the neural network. The undecomposed power information may thus be formed into a depth channel of the power map inputs to the neural network.

The scaling of the undecomposed power information may be based on the toggle rate. These are not instantaneous power values but rather function as coefficients that characterize the overall behavior of the circuit.

For instance, the total power may be computed from all the cells in a grid and the sum of all the powers may correspond to the switching power consumed by the circuit during the clock cycle. Switching may not occur in every timing window, and this fact may be utilized to generate a scaling factor. For instance, if switching occurs 50% of the time during the clock cycle, the scaling factor would be 0.5.

The undecomposed power information may provide insight into behavior beyond instantaneous power values. The undecomposed power information may take into account behaviors of the circuit as it may function in actual use case scenarios. By utilizing a scaling factor with undecomposed power information, a more accurate representation of the circuit's power behavior may be provided to the neural network.

Figure 12:
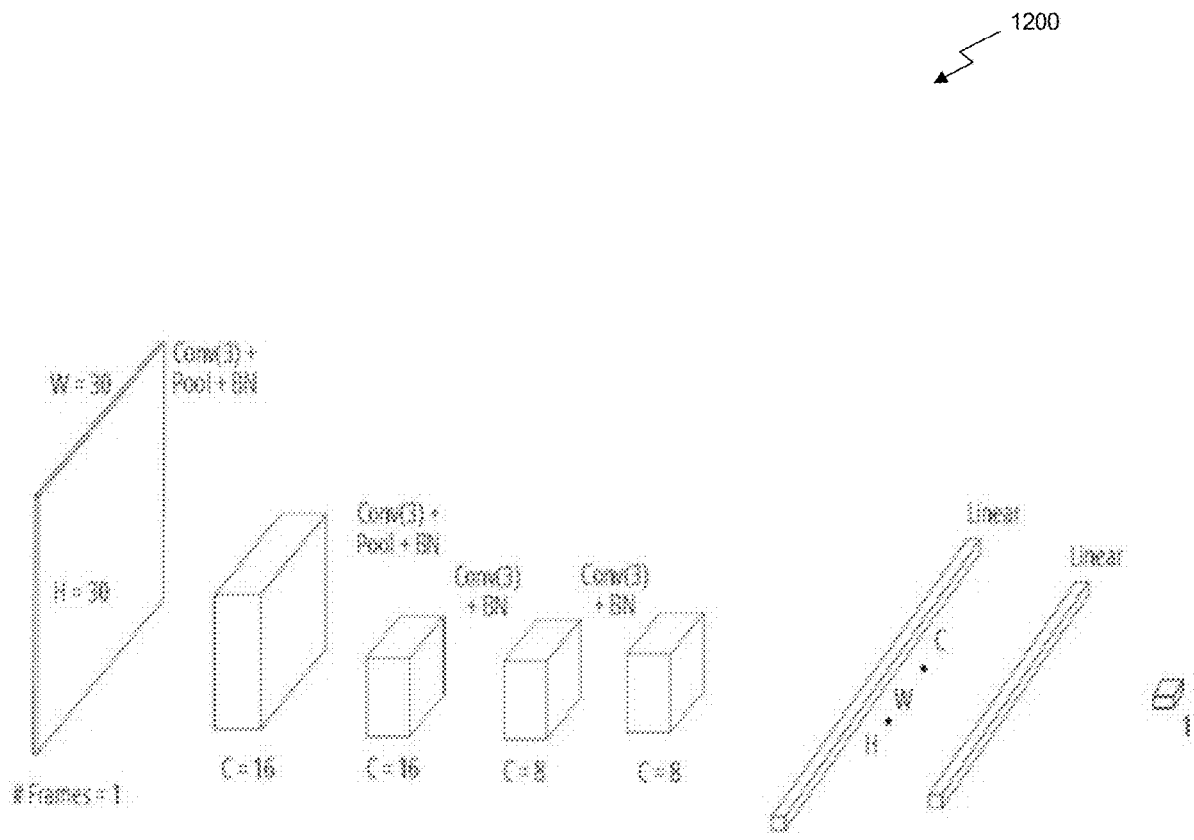
FIG. 12 illustrates a deep neural network, in accordance with an embodiment.

FIG. 12 depicts a deep neural network 1200 showing the detailed structure of one embodiment of a CNN. It has four convolutional layers, two pooling layers and two fully connected layers. Batch Normalization is adopted. L1 loss and an Adam optimizer are used for backpropagation.

Figure 13:
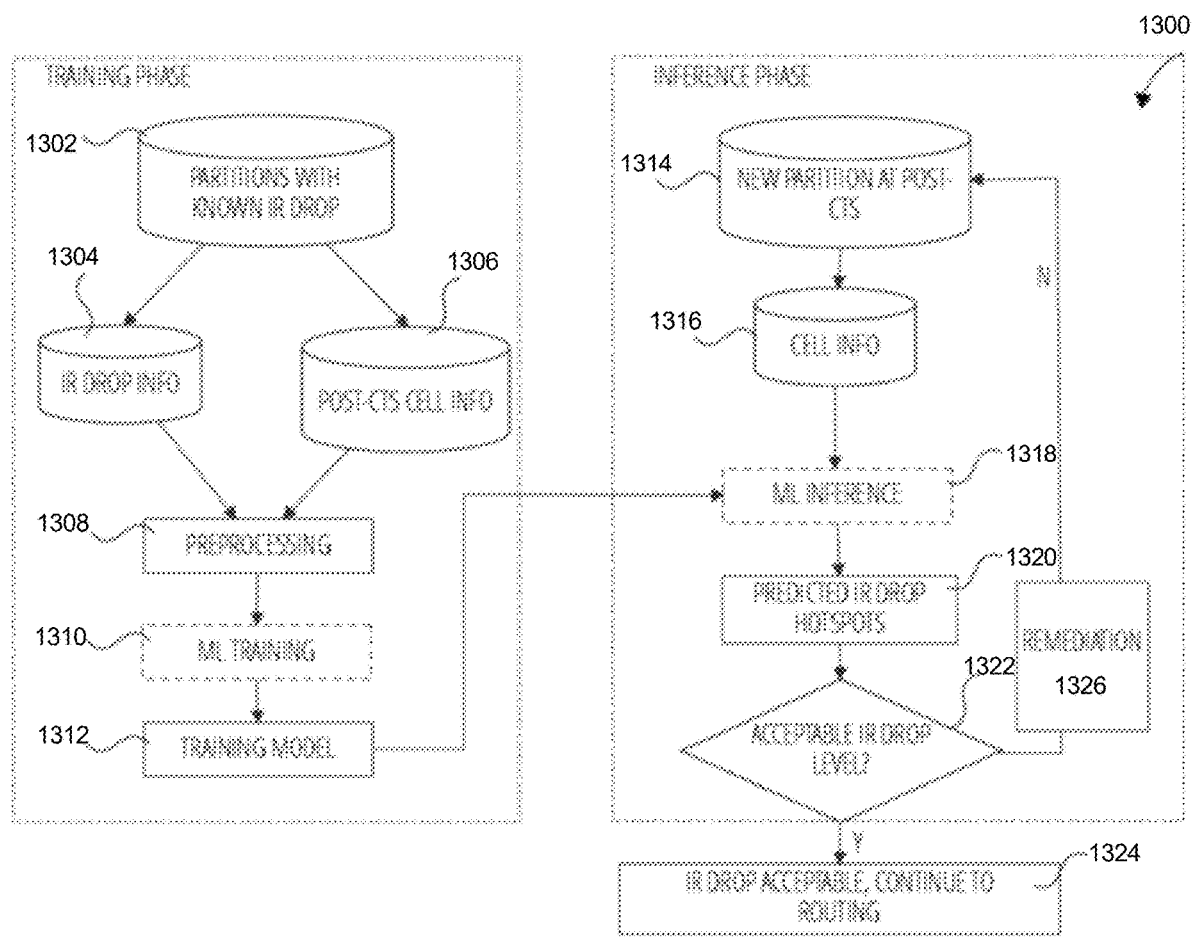
FIG. 13 illustrates a process to repair an excessive IR drop in a circuit, in accordance with an embodiment.

FIG. 13 depicts a process 1300 to repair an excessive IR drop in a circuit utilizing the described machine learning model. The process 1300 may be utilized to remediate IR drop hotspots during any physical circuit design stage. In the process 1300 the neural network prediction is utilized at the post-CTS (clock tree synthesis) stage.

The neural network may be trained (pre-processing logic 1308, machine learning training logic 1310) on a learning set of existing circuit partitions (partition training set 1302) with known IR drop information 1304 and known cell information 1306, to generate a training model 1312. After training, a machine inference 1318 engine such as a convolutional neural network is applied to predict hotspot locations for IR drop remediation based on cell information 1316 in one or more partition to analyze 1314. This results in IR drop predictions 1320 that are used to perform an IR drop threshold test 1322. For small regions with high IR drop, the layout of cells within the region may be adjusted or spread out. For large regions of high IR drop, the power grid distribution may be adjusted to lessen the IR drop or concentration of IR drop. The machine inference 1318 learns and updates its predictions until the IR drop becomes acceptable. Once IR drop remediation 1326 is performed, inference continues to other partitions, and when acceptable IR drop levels are achieved throughout the circuit, the partition design continues to the routing phase 1324.

Thus, techniques for training a neural network may involve generating a partitioned training set comprising power maps for a circuit structure. The power maps may be generated by partitioning the circuit structure into a grid comprising grid tiles. Then, for each cell of the circuit structure and for each of N≥2 sub-intervals of a clock period, the power consumption of each cell may be amortized into those grid tiles that comprise at least a portion of the cell, thus forming a set of power maps. Once the power maps are generated, they may be applied to the neural network to generate a maximal IR drop prediction for the circuit structure in the clock period. The neural network training may be performed with a training set of circuit structures with known IR drop characteristics. The neural network may also be trained with power information about the cells generated from a simulation of the cells.

In some instances, the maximal IR drop prediction generated by the neural network for a circuit structure in a clock period may be compared to a configured acceptable level of IR drop. The configured acceptable level of IR drop may function as part of an IR drop threshold test. On condition that the predictions are acceptable and/or remediated such that the maximal IR drop prediction meets the acceptable level of IR drop, the process may continue to a routing phase for generating the routing for the circuit structure.

In some instances, the process may enhance the power maps with sub-interval-independent values for scaled power, scaled internal power, and scaled switching power for the cells.

The machine inference 1318 need not be applied post-CTS and before routing in all cases. In other embodiments, the machine inference 1318 may be applied after logic block placement to adjust the power grid distribution or standard cell density in a region of the circuit before proceeding to CTS. Generally, there are many points in the circuit placement-and-routing process flow where the process 1300 could be applied wholly or in part.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
    at one or more devices that implement a neural network having a convolutional neural network (CNN) layer and a regression layer, wherein the neural network is trained to predict per-cell IR drop from a plurality of given power maps for a given circuit design, and wherein the neural network is trained using a learning set of existing circuit partitions with known IR drop information, and that implement a circuit design tool:
    receiving a plurality of power maps for a circuit design at the neural network;
    processing the plurality of power maps, by the CNN layer of the neural network, to predict a plurality of coefficient maps that include weight factors for a plurality of cells of the circuit design;
    processing the plurality of coefficient maps together with cell-level features for the plurality of cells of the circuit design, by the regression layer of the neural network, to predict an IR drop for each of the plurality of cells in the circuit design;
    modifying at least one of a cell layout of the circuit design or a power distribution of the circuit design, via the circuit design tool, to improve at least one of a timing or a functionality of the circuit design, based on the IR drop predicted for each of the plurality of cells in the circuit design, wherein the modifying results in an improved circuit design; and
    wherein a physical circuit is generated in accordance with the improved circuit design including at least:
        placing a plurality of transistors on a circuit board in accordance with the cell layout of the improved circuit design, and
        creating power distribution pathways in accordance with the power distribution of the circuit design.

2. The method of claim 1, wherein each of the plurality of power maps includes a two-dimensional image-based representation of power dissipation within the circuit at a particular instance of time.

3. The method of claim 1, wherein the CNN layer is a three-dimensional (3D) CNN layer.

4. The method of claim 3, wherein the 3D CNN considers a subset of the plurality of power maps during a single iteration.

5. The method of claim 1, wherein each of the plurality of coefficient maps indicates a time-varying distribution of power within a portion of the circuit design.

6. The method of claim 1, wherein for each of the plurality of coefficient maps, the regression layer multiplies the coefficient map with the cell-level features to determine the IR drop for the associated cell.

7. The method of claim 1, further comprising utilizing the CNN layer of the neural network to perform vector profiling.

8. The method of claim 7, wherein:
vector profiling includes reducing a multi-cycle vector into a subset of cycles, and
information from the CNN layer of the neural network is used to assist in the reduction of the multi-cycle vector.

9. The method of claim 1, wherein for each of the plurality of coefficient maps, the regression layer multiplies the weight factor included in the coefficient map for a corresponding cell of the circuit design with the cell-level features to predict the IR drop for the corresponding cell of the circuit design.

10. The method of claim 1, wherein the cell-level features include at least one of:
internal power,
leakage power,
switching power,
toggle rate scaled power,
overlap power,
total power, or
effective distance to power rail via stacks.

11. The method of claim 1, wherein plurality of coefficient maps include a weight factor for each cell of the circuit design.

12. The method of claim 1, wherein the one or more devices train the neural network having the convolutional neural network (CNN) layer and the regression layer, using the learning set of existing circuit partitions with known IR drop information.

13. The method of claim 12, wherein the learning set further includes known cell information.

14. The method of claim 1, wherein modifying the at least one of the cell layout of the circuit design or the power distribution of the circuit design includes modifying a region of the circuit design having a threshold level of IR drop.

15. The method of claim 14, wherein the cell layout within a region of the circuit design is modified when the region is below a threshold size and has the threshold level of IR drop.

16. The method of claim 15, wherein the cell layout within the region of the circuit design is modified by spreading out cells in the region to reduce a cell density in the region.

17. The method of claim 14, wherein power distribution within a region of the circuit design is modified when the region is above a threshold size and has the threshold level of IR drop.

18. The method of claim 17, wherein the power distribution within the region of the circuit design is modified to lessen the IR drop or a concentration of the IR drop.

19. The method of claim 1, further comprising, at the one or more devices:
generating a routing for the improved circuit design, via the circuit design tool;
wherein the physical circuit is generated by further creating wired connections among the plurality of transistors in accordance with the routing of the improved circuit design.

20. An apparatus comprising:
a non-transitory memory storage comprising instructions; and
one or more processors in communication with the memory, wherein the one or more processors execute the instructions to:
receive a plurality of power maps for a circuit design at a neural network having a convolutional neural network (CNN) layer and a regression layer, wherein the neural network is trained to predict per-cell IR drop from a plurality of given power maps for a given circuit design, and wherein the neural network is trained using a learning set of existing circuit partitions with known IR drop information;
process the plurality of power maps, by the CNN layer of the neural network, to predict a plurality of coefficient maps that include weight factors for a plurality of cells of the circuit design;
process the plurality of coefficient maps together with cell-level features for the plurality of cells of the circuit design, by the regression layer of the neural network, to predict an IR drop for each of the plurality of cells in the circuit design;
modify at least one of a cell layout of the circuit design or a power distribution of the circuit design, via the circuit design tool, to improve at least one of a timing or a functionality of the circuit design, based on the IR drop predicted for each of the plurality of cells in the circuit design, wherein the modifying results in an improved circuit design; and
wherein a physical circuit is generated in accordance with the improved circuit design including at least:
placing a plurality of transistors on a circuit board in accordance with the cell layout of the improved circuit design, and
creating power distribution pathways in accordance with the power distribution of the circuit design.

21. The apparatus of claim 20, wherein each of the plurality of power maps includes a two-dimensional image-based representation of power dissipation within the circuit at a particular instance of time.

22. The apparatus of claim 20, wherein the CNN layer is a three-dimensional (3D) CNN layer.

23. The apparatus of claim 22, wherein the 3D CNN considers a subset of the plurality of power maps during a single iteration.

24. The apparatus of claim 20, wherein each of the plurality of coefficient maps indicates a time-varying distribution of power within a portion of the circuit design.

25. A non-transitory computer-readable media storing computer instructions which when executed by one or more processors of a device cause the one or more processors to cause the device to:
receive a plurality of power maps for a circuit design at a neural network having a convolutional neural network (CNN) layer and a regression layer, wherein the neural network is trained to predict per-cell IR drop from a plurality of given power maps for a given circuit design, and wherein the neural network is trained using a learning set of existing circuit partitions with known IR drop information;
process the plurality of power maps, by the CNN layer of the neural network, to predict a plurality of coefficient maps that include weight factors for a plurality of cells of the circuit design;
process the plurality of coefficient maps together with cell-level features for the plurality of cells of the circuit design, by the regression layer of the neural network, to predict an IR drop for each of the plurality of cells in the circuit design;
modify at least one of a cell layout of the circuit design or a power distribution of the circuit design, via the circuit design tool, to improve at least one of a timing or a functionality of the circuit design, based on the IR drop predicted for each of the plurality of cells in the circuit design, wherein the modifying results in an improved circuit design; and wherein a physical circuit is generated in accordance with the improved circuit design including at least:
  placing a plurality of transistors on a circuit board in accordance with the cell layout of the improved circuit design, and
  creating power distribution pathways in accordance with the power distribution of the circuit design.

26. The non-transitory computer-readable media of claim 25, wherein each of the plurality of power maps includes a two-dimensional image-based representation of power dissipation within the circuit at a particular instance of time.

* * * * *